United States Patent

Namba et al.

[11] Patent Number: 4,479,469
[45] Date of Patent: Oct. 30, 1984

[54] INTERNAL COMBUSTION ENGINE

[75] Inventors: Yuzuru Namba; Kenichi Aoyagi; Hiroshi Yokoyama, all of Hamamatsu, Japan

[73] Assignee: Suzuki Jidosha Kogyo Kabushiki Kaisha, Japan

[21] Appl. No.: 300,112

[22] Filed: Sep. 8, 1981

[30] Foreign Application Priority Data

Sep. 29, 1980 [JP] Japan ............... 55-135608
Nov. 8, 1980 [JP] Japan ............... 55-157320

[51] Int. Cl.³ .................................. F02M 35/10
[52] U.S. Cl. .................................... 123/308
[58] Field of Search ............ 123/52 MB, 188 M, 308, 123/432, 52 M

[56] References Cited

U.S. PATENT DOCUMENTS 4,194,474  3/1980  Endo ....................... 123/308
4,271,802  6/1981  Hori et al. ................. 123/432

FOREIGN PATENT DOCUMENTS 0071706  6/1978  Japan ....................... 123/308
0013807  2/1979  Japan ....................... 123/432
0103913  8/1979  Japan ....................... 123/308
0093922  7/1980  Japan ....................... 123/308

Primary Examiner—Craig R. Feinberg
Assistant Examiner—W. R. Wolfe
Attorney, Agent, or Firm—Quaintance & Murphy

[57] ABSTRACT

A suction system for an internal combustion engine which is equipped with a sub-suction path provided separately from a main suction path for generating a swirl of the gases in a combustion chamber during the suction stroke. The amount of the air to be supplied via the sub-suction path to the combustion chamber is less than 40% preferably from 10 to 40%, more preferably from 20 to 30% of the total amount of the air to be supplied to the combustion chamber. Alternatively the effective area of the sub-suction path at its outlet end is 0.2 to 3.0% of that of the main suction path.

7 Claims, 5 Drawing Figures

INTERNAL COMBUSTION ENGINE

BACKGROUND OF THE INVENTION

The present invention relates to a suction system for an internal combustion engine which has a sub-suction path formed separately from a main suction-path.

Recently, internal combustion engines for automobiles are required not only to purify the exhaust gas but also to improve the rate of fuel consumption. For these requirements, exhaust gas recirculation (EGR) and a lean combustion are frequently employed. It is known that in order to prevent combustion fluctuations and misfiring while satisfying both the requirements for EGR and lean combustion; it is satisfactory to increase the burning velocity.

In order to raise this burning velocity, there have been recently proposed several systems, in which a sub-suction path provided separately from a main suction path is designed to inject a gas into a combustion chamber thereby to generate a swirl of the gases in the combustion chamber.

However, the suction system provided with the sub-suction path is still being developed.

SUMMARY OF THE INVENTION

A primary object of the present invention is to provide a suction system for an internal combustion engine provided with a sub-suction path, which system improves the rate of fuel consumption (mileage) and facilitates the setting of a fuel supply device such as a carburetor.

A secondary object of the present invention is to provide a suction system for an internal combustion engine provided with a sub-suction path, which system makes the intensity of the swirl of gases in a combustion chamber sufficient for improving a lean combustion limit during EGR thereby improving the rate of fuel consumption.

The primary object is achieved by the present invention wherein the amount of the air to be supplied via the sub-suction path to a combustion chamber is less than 40%, preferably from 10-40% and more preferably from 20-30% of the total amount of the air supplied to the combustion chamber.

On the other hand, the secondary object is achieved by setting the effective area of the sub-suction path at the outlet end thereof to 0.2 to 3.0% of that of the main suction path.

DESCRIPTION OF THE PREFERRED EMBODIMENT

Figure 1:
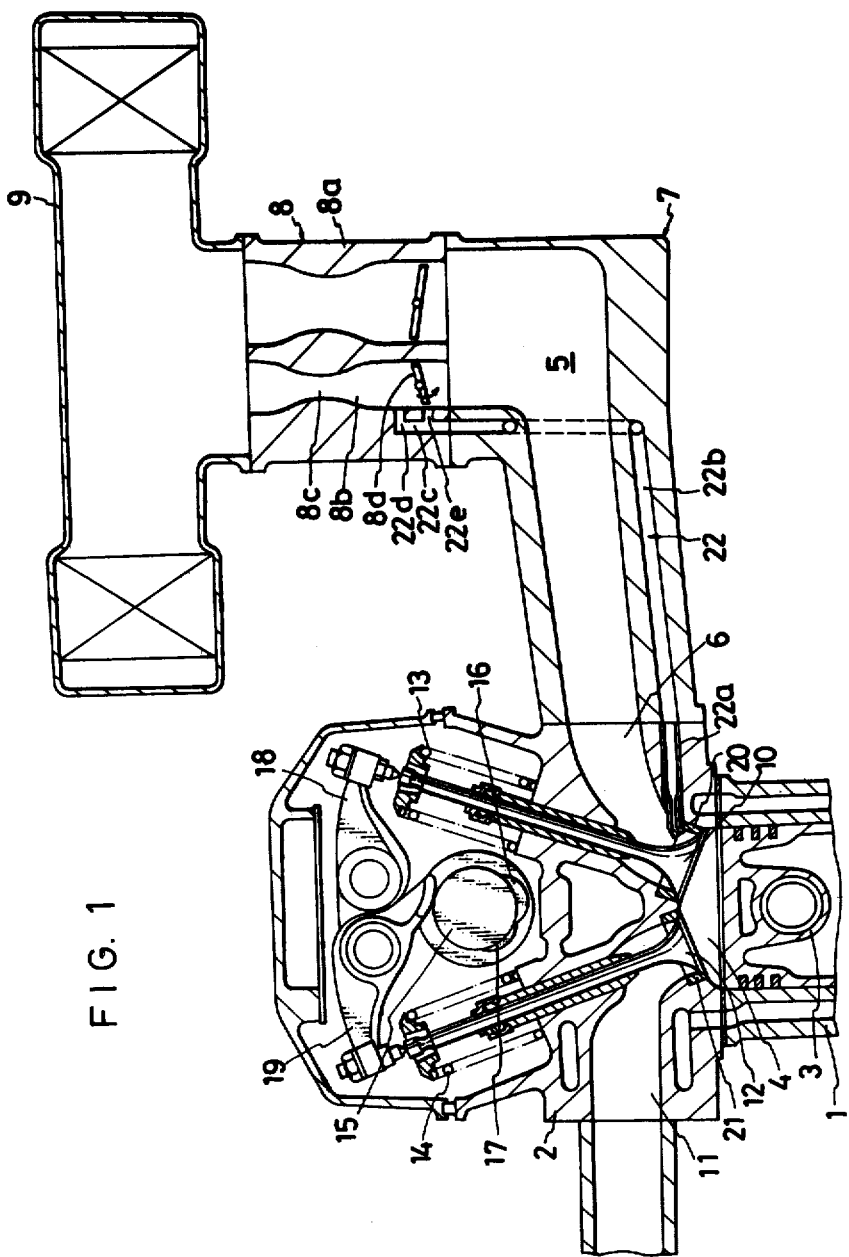
FIG. 1 is a schematic view showing one embodiment of the present invention.

Referring now to the drawings and in particular to FIG. 1 there is shown an internal combustion engine of the present invention. The engine comprises a cylinder 1, a cylinder head 2 and a piston 3, which define a combustion chamber 4 into which a main suction path 5 is opened. The main suction path 5 is constructed as a path which extends from a suction port 6 formed in the cylinder head 2, a suction manifold 7, a two-barrel carburetor 8 acting as a fuel supply device up to an air cleaner 9.

The outlet end of the suction port 6, i.e., the open end opened into the combustion chamber 4 is equipped with a suction valve 10, by which the suction port 6 is opened or closed. An exhaust port 11 formed in the cylinder head 2 is opened or closed by an exhaust valve 12. The valves 10 and 12 are opened or closed by the action of a control mechanism which is constructed of return springs 13 and 14, cams 16 and 17 driven by a cam shaft 15 and rocker arms 18 and 19, and so on, so that they are seated upon their respective valve seats 20 and 21 when closed.

The engine has a sub-suction path 22 which has a smaller effective opening area than that of the main suction path 5. The sub-suction path 22 comprises an injection nozzle pipe 22a press-fitted into the cylinder head 2; a path portion 22b formed in the suction manifold 7; a path portion 22c formed in the body 8a of the carburetor 8; and two inlet ends 22d and 22e bifurcated from the path portion 22c and both opened into the primary path portion 8b of the carburetor 8. Both the two inlet ends 22d and 22e are spaced in the flow direction of the path portion 8b. Specifically, the upstream side inlet end 22d is always opened between the primary venturi portion 8c and the primary throttle valve 8d of the carburetor 8; whereas the downstream side inlet end 22e is opened at such a position as is closed by the primary throttle valve 8d at its closed (i.e., idling) position.

The injection nozzle pipe 22a constituting the outlet end portion of the sub-suction path is designed to have, at its end, a nozzle portion with a reduced diameter. The pipe 22a is fitted in the cylinder head 1 such that it is opened immediately upstream of the suction valve 10. Moreover, the injection nozzle pipe 22a is directed substantially in the tangential direction of the wall of the cylinder so that a swirl of the suction gases is generated around the axis of the cylinder in the combustion chamber 4. The swirling direction is determined such that the suction gases flow toward the exhaust port 11 after they sweep past an ignition plug (not shown).

The exhaust gas is recirculated from the exhaust path via an EGR valve to either the main suction path 5 or the sub-suction path 22. The construction of the EGR path and EGR valve can be made similar to those of the prior art, and are therefore omitted from the drawings.

In the internal combustion engine of the present invention, during the suction stroke where the suction valve 10 is opened, the combustion chamber 4 is supplied with an air-fuel mixture from the main suction path 5, whereas a gas (which contains at least air) is sucked into the sub-suction path 22 to be injected into the combustion chamber 4. By the injection of the gas from the sub-suction path 22, the mixture sucked into the combustion chamber 4 is swirled around the axis of the cylinder 1 so that the burning velocity is accelerated.

According to one embodiment of the present invention, the amount of the air to be supplied via the sub-suction path 22 to the combustion chamber during the suction stroke is less than 40%, preferably 10%–40% more preferably 20–30% of the total amount of the air to be supplied to the combustion chamber. In case the degree of opening of the throttle valve 8d is increased so that the total amount of the air sucked is increased, for attaining the ratio of the air from the sub-suction path, the opened positions and the effective areas of both the inlet ends 22d and 22e (especially the inlet end 22e) of the sub-suction path 22 are determined relative to the opening degree of the throttle valve 8d. Alternatively, another flow control valve may be connected with the sub-suction path 2 thereby to attain the aforementioned ratio.

Figure 2:
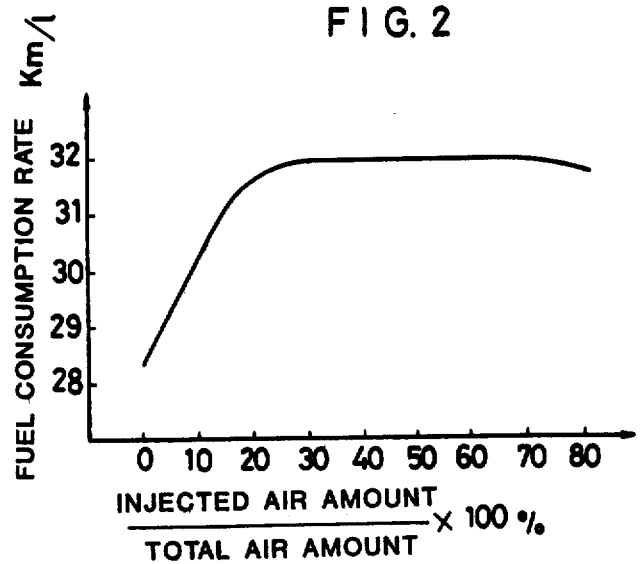
FIG. 2 is a graphical representation illustrating the relationship between the ratio of the amount of the air injected from a sub-suction path to the total amount of the air sucked into a combustion chamber and the fuel consumption rate (km/l).

The reason why the air ratio is determined in the aforementioned manner will be described hereinafter with reference to FIGS. 2 and 3. FIG. 2 illustrates the relationship between the air ratio and the rate of the fuel consumption under the running condition of 40 km/hr-L at such an ignition timing as makes the rate of the fuel consumption the lowest. It will be apparent in view of FIG. 2 that the rate of the fuel consumption tends to remarkably be improved until the ratio of the air supplied through the sub-suction path 22 (which will be briefly referred to as an "injected air ratio") is increased to 30%. Thereafter there is no improvement in the rate of the fuel consumption when the ratio exceeds 30%. More than 10% is practically preferable and more than 20% is more preferable.

Figure 3:
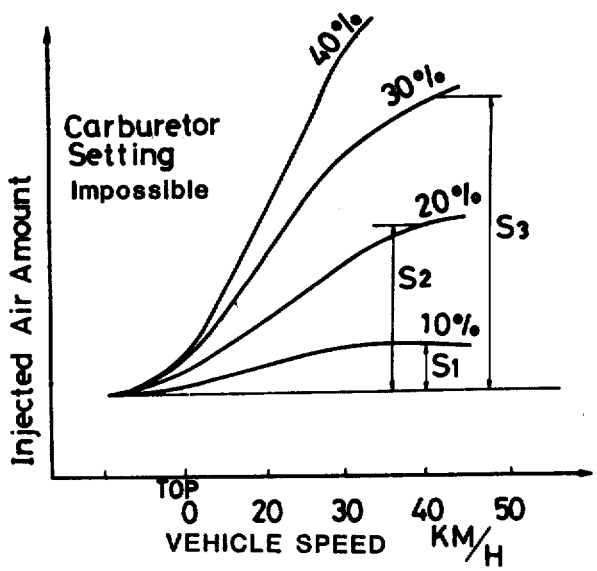
FIG. 3 is a graphical representation illustrating the relationship between the amount of the air injected from the sub-suction path and the vehicle speed.

On the other hand, FIG. 3 illustrates the influence of the injected air ratio upon the vehicle speed (at the running speed of 40 km/hr-L) under the condition in which the vehicle is run at its top gear ratio and at the ignition timing making the rate of the fuel consumption the lowest. Even for all the injected air ratios, the setting has been made such that the fuel is supplied at an identical flow rate from the carburetor 8 during the idling operation. In FIG. 3, the changes in the opening degree of the throttle valve 8d necessary for the changes from the idling operation to the running operation at the vehicle speed of 40 km/hr are in inverse proportion to the values $S_1$ to $S_3$ into consideration, it will be understood that the larger the injected air ratio is, the smaller is the changes in the opening degree of the throttle valve 8d necessary for attaining a predetermined change in the vehicle speed i.e., that the fuel supply rate has to be largely changed for a small change in the opening degree of the throttle valve 8d and that the setting of the carburetor 8 becomes impossible for the injected air rate of higher than 40%. Therefore, the injected air rate should be not more than 40% and less than 30% is preferred in view of the carburetor setting.

Considering both the aforementioned relationship between the improvement in the fuel consumption rate as shown in FIG. 2 and the feasibility in the setting of the carburetor 8, it will also be understood that the injected air ratio of less than 40%, preferably from 10 to 40% and more preferably from 20 to 30% is desired.

Figure 4:
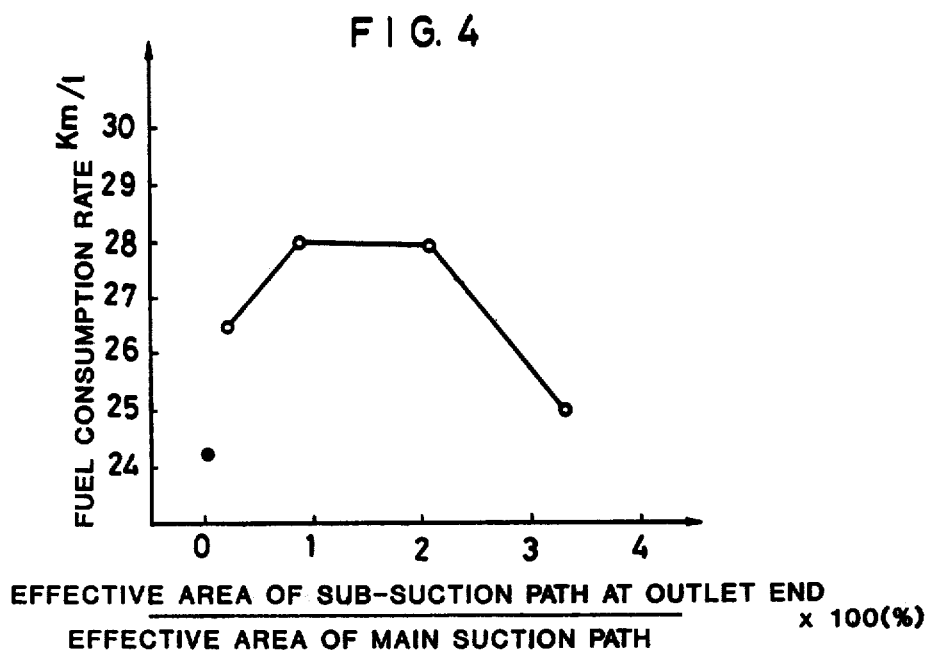
FIG. 4 is a graphical representation illustrating the relationship between ratio of the effective area of the sub-suction path at the outlet end thereof to that of a main suction path and the rate of the fuel consumption.
Figure 5:
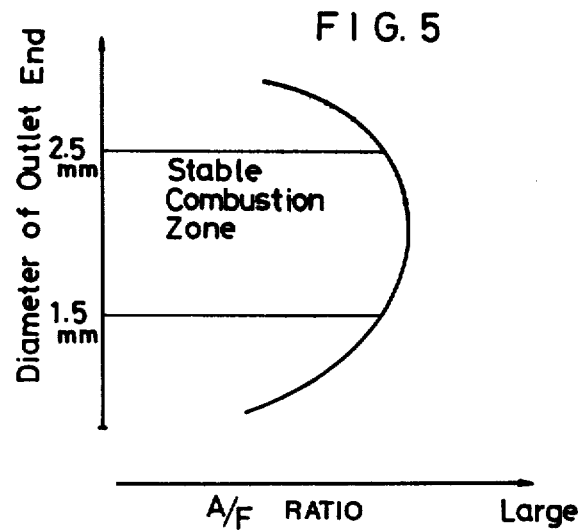
FIG. 5 is a graphical representation illustrating the relationship between the diameter of the sub-suction path at the outlet end thereof and the air-fuel (A/F) ratio.

In another embodiment of the present invention, the effective area of the tip of the aforementioned injection nozzle pipe 22a is set within a range of 0.2 to 3.0% of that of the suction port 6, and the diameter of the tip of the injection nozzle pipe 22a is preferably set at 1.5 to 2.5 mm. By setting effective area of the outlet end of the sub-suction path in the aforementioned manner, the lean combustion limit is enhanced, in other words, a stable combustion can be ensured even at a higher air-fuel ratio than the prior art. This effect of the present invention is shown in FIG. 4. The effect resulting from the construction in which the diameter of the outlet end of the sub-suction path 22 is set at 1.5 to 2.5 mm, is shown in FIG. 5. In FIG. 4, a solid point denotes the fuel consumption rate of the existing engine and hollow points denote the engine according to the present invention. FIG. 5 illustrates the results measured under the condition in which the injected air ratio from the sub-suction path 22 is held constant under a running condition corresponding to the street run.

The reason why the effective area of the sub-suction path 22 at the outlet end thereof exerts heavy influence upon the limit of the lean combustion is believed to come from the following phenomena. Specifically, there is a fixed limit to the flow amount of the gas to be sucked from the sub-suction path 22 into the combustion chamber during the suction stroke by utilizing the vacuum developed in the combustion chamber 4. If the effective area of the sub-suction path at the outlet end thereof is decreased, the injection velocity is accelerated whereas the amount of injected gas via the sub-suction path is decreased. An inverse phenomenon takes place if that effective area is increased. In addition, it is considered the wider effective area of the suction port 6 serves to diffuse the gas injected from the sub-suction path 2, thus exerting serious influences.

Although the foregoing description is directed to the specific embodiments, the present invention should not be limited thereto but can be extended to the following modifications. For example, an electrically controlled fuel injection type device may be used as the fuel supply device in place of the carburetor. Moreover, the sub-suction path may have its inlet end opened at a suitable position, for example, vented to the atmosphere.

What is claimed is:

1. An internal combustion engine comprising:
   A. a combustion chamber defined by a cylinder, a piston, and a cylinder head; and
   B. a carburetor constituting means for mixing fuel with air and supplying the resultant air-fuel mixture to the combustion chamber via a main suction path; said carburetor having a main barrel comprising a venturi and a main barrel throttle valve and a secondary barrel comprising a secondary venturi and a secondary throttle valve; and
   C. a sub-suction path provided separately from said main suction path for injecting a gas into the combustion chamber during the suction stroke of the piston thereby to generate a swirl in the suction gases in the combustion chamber thereby improving their rate of combustion; wherein the outlet end of the sub-suction path is into the main suction path at a point directly upstream of the suction valve;
   wherein the amount of air supplied to said combustion chamber via said sub-suction path is from 10 to 40% of the total amount of air supplied to said combustion chamber;
   wherein the area of the sub-suction path at its open end is 0.2 to 3.0% of the area of the main suction path;
   wherein the internal diameter of the outlet end of said sub-suction path is 1.5 to 2.5 mm.

2. An internal combustion engine comprising:

A. a combustion chamber defined by a cylinder, a piston, and a cylinder head; and B. a carburetor constituting means for mixing fuel with air and supplying the resultant air-fuel mixture to the combustion chamber via a main suction path; said carburetor having a main barrel comprising a venturi and a main barrel throttle valve and a secondary barrel comprising a secondary venturi and a secondary throttle valve; and C. a sub-suction path provided separately from said main suction path for injecting a gas into the combustion chamber during the suction stroke of the piston thereby to generate a swirl in the suction gases in the combustion chamber thereby improving their rate of combustion; wherein the outlet end of the sub-suction path is into the main suction path at a point directly upstream of the suction valve;

wherein the amount of air supplied to said combustion chamber via said sub-suction path is from 20 to 40% of the total amount of air supplied to said combustion chamber;

wherein the area of the sub-suction path at its open end is 0.2 to 3.0% of the area of the main suction path;

wherein the internal diameter of the outlet end of said sub-suction path is 1.5 to 2.5 mm.

3. An internal combustion engine comprising:

a main suction path connected with a fuel supply device and adapted to be opened and closed by a suction valve; and a sub-suction path provided separately from said main suction path for injecting a gas into a combustion chamber during the suction stroke thereby to generate a swirl in the suction gases in said combustion chamber, said sub-suction path having an outlet and opened immediately upstream of said suction valve;

wherein the amount of the air supplied to said combustion chamber via said sub-suction path is from 10 to 40% of the total amount of the air supplied to said combustion chamber; and wherein the effective area of said sub-suction path at the outlet end thereof is 0.2 to 3.0% of the area of said main suction path.

4. An internal combustion engine according to claim 3, where said fuel supply device includes a carburetor, said sub-suction path has two upstream and downstream side inlet ends opened into a path of said carburetor and spaced in the flow direction of the path of said carburetor such that the upstream side inlet end is always opened into the path of said carburetor between a venturi portion and a throttle valve of said carburetor whereas the downstream side inlet end is opened at such a position that it is closed by said throttle valve under the idling condition.

5. An internal combustion engine of claim 3 wherein the amount of air supplied to said combustion chamber via said sub-suction path is from 20 to 30% of the total amount of air supplied to said combustion chamber.

6. An internal combustion engine according to claim 5, wherein the internal diameter of the outlet end of said sub-suction path is 1.5 to 2.5 mm.

7. An internal combustion engine according to claim 5 or 4, wherein the outlet end of said sub-suction path is constructed of an injection nozzle pipe which is fitted in a cylinder head.

* * * * *